F. E. HUFFORD.
AIR COMPRESSOR.
APPLICATION FILED MAR. 8, 1913.
1,094,994.
Patented Apr. 28, 1914.
2 SHEETS—SHEET 1.
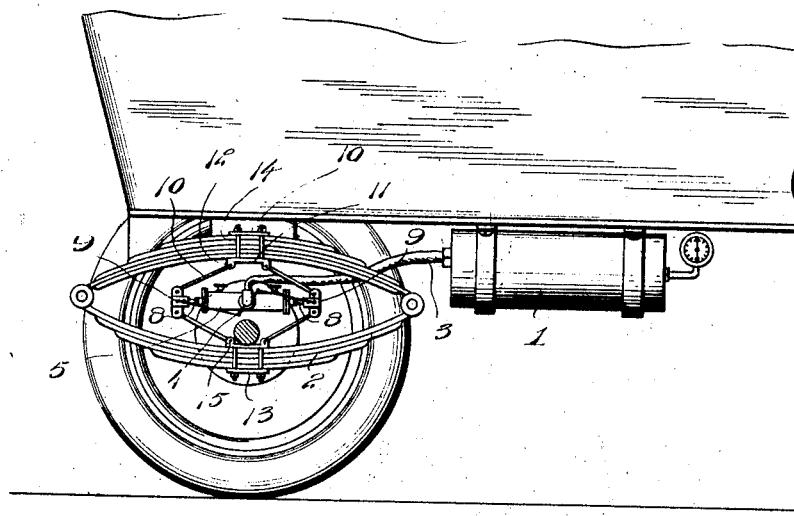
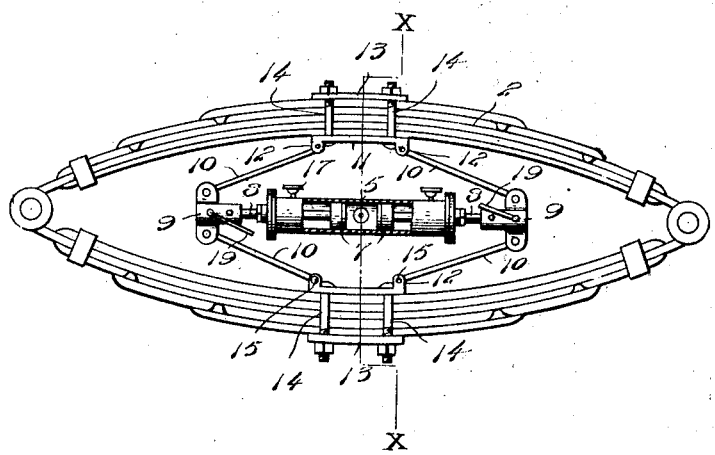
Inventor
Floyd E. Hufford.
Witnesses
By Victor J. Evans
Attorney

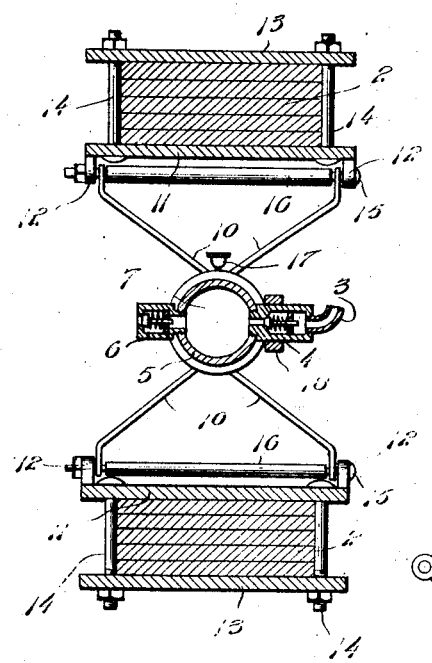

UNITED STATES PATENT OFFICE.

FLOYD E. HUFFORD, OF MILFORD, ILLINOIS.

AIR-COMPRESSOR.

1,094,994.  Specification of Letters Patent.  Patented Apr. 28, 1914.

Application filed March 8, 1913. Serial No. 753,044.

*To all whom it may concern:*

Be it known that I, FLOYD E. HUFFORD, a citizen of the United States, residing at Milford, in the county of Iroquois and State of Illinois, have invented new and useful Improvements in Air-Compressors, of which the following is a specification.

In the operation of vehicles it is desirable to provide a tank containing air under pressure which may be utilized for a variety of purposes such as inflating tires, forcing fuel and lubricant to the required points of use and for operating signals, brakes and the like. It is also advantageous to prevent the rebound of the springs so as to avoid recoil, which is injurious alike to the springs and parts of the vehicle as well as uncomfortable and at times dangerous to the occupant.

The present invention provides unique means for utilizing the action of the springs of a vehicle for charging a tank with air under pressure and also to prevent violent rebound of such springs when compressed by a wheel of the vehicle dropping into a rut or depression or passing over an obstruction.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a detail view, showing the application of the invention to a vehicle and utilized both as a shock absorber and operating means for an air compressor. Fig. 2 is a side view of a vehicle spring of the elliptical type, showing the invention in position. Fig. 3 is a transverse section on the line $x$—$x$ of Fig. 2. Fig. 4 is a detail view, showing the clamp for connecting the links to a member of the spring. Fig. 5 is an enlarged sectional view of the clamp. Fig. 6 is a side view of an elliptic spring provided with a shock absorber embodying the invention, showing more clearly the means for holding the cylinder in a fixed relative position.

Corresponding and like parts are referred to in the following description, and indicated in all the views of the drawings, by the same reference characters.

The numeral 1 designates a tank which may be located in any convenient position upon the vehicle and which is adapted to contain air under pressure to be used for any desired purpose, such as inflating the tires, operating the brake or forcing fuel or lubricant to the required points.

The numeral 2 designates a spring of the vehicle which may be of any type and which is shown as consisting of the elliptical variety. The air compressor is arranged in coöperative relation with the spring to be actuated thereby on the rebound so as not to interfere with its free compression when a wheel of the vehicle passes over an obstruction or drops into a depression. A pipe 3 connects the compressor with the tank 1 for conveying the air discharged from the compressor to the tank. An outwardly opening check valve 4 prevents back pressure of air from the tank.

The air compressor comprises a cylinder 5 which is provided at a central point with a valve controlled air inlet 6. The pipe 3 also connects with the cylinder 5 at a central point. Pistons 7 are arranged to operate in end portions of the cylinder 5 and rods 8 connected thereto pass through stuffing boxes fitted to the ends of the cylinder. A crosshead 9 is secured to the outer end of each rod 8 and links 10 connect the arms of the crosshead with the members of the spring 2. The parts are arranged so that the pistons 7 move simultaneously in opposite directions. Upon the outstroke of the pistons, due to compression of the vehicle spring, air is drawn into the middle portion of the cylinder through the inlet 6 and upon the instroke of the pistons, due to the rebound or return of the spring to normal position, the air previously drawn into the cylinder is expelled therefrom and is directed to the tank 1 by means of the pipe 3. To prevent any side strain upon the vehicle spring the links 10 are provided in pairs and have an opposite inclination. There are four pairs or sets of links, two above and two below the compressor. The links are pivotally connected at their inner ends to the cross-heads 9 in any manner and their outer ends are pivotally connected to clips which are secured to the members comprising the elliptical spring 2. Each of the clips consists of a plate 11 having pairs of ears 12, a plate 13 and connecting bolts 14. The plate 11 is placed against the inner side of a member of the vehicle spring and the plate 13 is placed against the outer side of such member, the bolts 14 connecting end portions of the plates at the sides of the spring. The ears 12 are pierced and receive bolts 15 which pass through openings formed in the outer ends of the links 10. A spacing sleeve 16 is mounted upon each of the bolts 15 with its ends touching the inner sides of the links mounted on such bolt so as to confine the links between the ears 12 and the extremities of the spacing sleeve. The upper and lower pairs of links incline in opposite directions, hence compression of the vehicle spring causes the pistons 7 to move outward in the cylinder 5 and a tendency of the vehicle spring to rebound causes the pistons to move inward in the cylinder 5, thereby compressing the air and forcing the same through the pipe 3 into the tank 1. The expansion or rebound of the vehicle spring is retarded by the action of the compressor, with the result that violent shock is prevented and discomfort to the occupant of the vehicle overcome. It is to be understood that the invention may be adapted to any one or each of the springs of a vehicle irrespective of the kind of spring with which the vehicle may be fitted. Oil cups 17 are fitted to the sides of the cylinder near the ends thereof for lubricating the pistons.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

A lever 18 is mounted at a central point upon the cylinder 5 and its ends are connected by rods 19 with the cross heads 9. As the pistons 7 move outward the cross heads 9 separate and through the rods 19 cause the lever 18 to turn about its pivotal connection with the cylinder 5, thereby holding the latter in a central or fixed relative position, thereby preventing any relative endwise movement of the cylinder. To prevent interference of the lever 18 with the valves it is preferred to provide such lever with a ring or band at a central point and to have such ring or band mounted upon the casing of the valve to turn thereon.

Having thus described the invention what is claimed as new, is:—

In combination, two members arranged to move in opposition, a cylinder located midway between such members at right angles to their line of movement, pistons arranged to move in opposite ends of the cylinder, oppositely inclined links connecting the outer end of each piston rod with the before mentioned members, a lever mounted intermediate of its ends upon the cylinder and normally inclined to the line of movement of the pistons and the said opposed members and links connecting the extremities of said lever with the piston rods.

In testimony whereof I affix my signature in presence of two witnesses.

FLOYD E. HUFFORD.

Witnesses:
L. V. WILLIAMS,
C. E. SINN.